United States Patent Office 3,168,452
Patented Feb. 2, 1965

3,168,452
METHOD OF MAKING A DERIVATIVE OF
SALICYLIC ACID
Anthony Debe, 18203 Canterbury Road, Cleveland, Ohio
No Drawing. Filed June 28, 1961, Ser. No. 120,199
15 Claims. (Cl. 204—44)

The present invention relates to a composition comprising a reaction product of salicylic acid and hexamethylene tetramine and to a method of making the same.

It is an object of the present invention to provide a composition which is an excellent smoothing and grain refining agent for electrodeposited metals of copper, and copper-zinc alloys plated from alkaline cyanide solutions, the composition including the reaction products of salicylic acid and hexamine, otherwise known as hexamethylene tetramine, as well as unreacted starting materials.

It is an object of the present invention to provide a composition which is an excellent anode corroder for the electroplating baths for metals of copper, zinc and copper-zinc alloys.

It is the object of the present invention to provide an anode corroder and a smoothing and grain refining agent including an amino derivative of salicylic acid, preferably a para-amino derivative, in which hexamine and salicylic acid are reacted at a pH of from 2.5 to 5.5 and a temperature from 125° F. to 190° F., and the reaction product further reacted with alkaline metal hydroxide at 70° to 190° F. with a final pH of preferably from about 9½ to 10½.

It is an object of the present invention to provide a method of making a solution ingredient for plating baths, the ingredient comprising an amino derivative of salicylic acid, preferably the p-amino derivative.

The present invention provides an anode corroder, a smoothing and grain refining agent for electrodeposited metals of copper and copper-zinc alloys, a method of making the same for use in alkaline cyanide plating solutions, and a method for producing amino derivatives of salicylic acid.

In the present invention, an acid reaction product is made by reacting hexamine and salicylic acid generally at a pH from about 2.5 to 5.5 and preferably from about 4.2 to 4.8, at a temperature of generally about 125° to 190° F. and preferably from about 156° to 170° F. for a period from about 8 hours to several days and preferably for 20 to 40 hours as a water solution and slurry, the entire mixture being a water solution when the reaction has proceeded for a period of one to four hours and remaining a water solution thereafter. The acid reaction product is then further reacted with an alkali metal hydroxide (preferably potassium hydroxide although sodium hydroxide is satisfactory), and small amount of additional hexamine added either immediately after the above reaction period or after several hours or even several days. The additional hexamine is reacted with the acid reaction product at the temperature of producing the acid reaction product (125° to 190° F.) or may be reacted upon cooling the reaction mixture. However, the additional hexamine is reacted preferably at about 150° to 170° F. Alkali metal hydroxide is then added to the material until the material has a pH of from about 8½ to 12 and preferably a pH from about 9½ to 10½.

The product so produced is excellent for use in copper, zinc, and copper-zinc alloy plating solutions of the alkaline cyanide type, but, to make the product more stable for storage and to further enhance its grain refining capacity, there is further added an alkali tartrate, preferably potassium tartrate, and the final pH adjusted preferably to a value between about 9.5 and 10.5 or sometimes even as high as 10.9. All pH measurements used herein are made with the glass electrode at 20° C. No correction is made for sodium ion or ion concentrations.

In the present invention, the acid reaction product is made by reacting about 1 to 3½ moles of salicylic acid with about 1 mole of hexamine for at least about 4 hours and for better results, at least about 8 hours. After the reaction has proceeded for about 8 hours up to as long as several days, there is added about 0.05 to about 0.3 mole of additional hexamine. While the above range is generally satisfactory, the amount of additional hexamine preferably is about 0.1 to 0.2 mole. In addition, after mixing in the above described additional hexamine, and preferably within 1 to 4 hours thereafter; about 1 to 1.9 moles and preferably 1.2 to 1.6 moles of an alkali metal hydroxide, which is preferably potassium hydroxide, is added to the aqueous solution and the reaction continued for at least 2 and preferably 4 to 12 hours or even longer—up to several days if desired, although no additional advantages are obtained by longer reaction times.

Generally the amount of water used when the hexamine and salicylic acid are first reacted is about 30 to 90 moles, and preferably 40 to 60 moles, although, as little as 20 moles or even as high as 90 to 95 moles or more can be used per mole of hexamine.

When adding the limited amount of additional hexamine (.05 to 0.3 mole based on one mole of hexamine starting material), about 5 to 25 moles and preferably 10 to 18 moles of water is used to make a premixed solution of the additional hexamine and the limited amount of caustic, namely the 1 to 1.9 moles of KOH or other alkali metal hydroxide.

As before discussed, to help stabilize the resultant solution and to increase its grain refining activity, generally about ½ to 3½ moles and preferably about 1½ to 2½ moles of potassium tartrate or other alkali metal tartrate is also added to the solution.

The present invention provides a product improvement over a process in which salicylic acid and hexamethylene tetramine (also called hexamine) are reacted at temperatures of 125°–190° at a pH of 2½ to 5½ for about 16 to 32 hours. At the end of this time, according to the present invention, the solution is further reacted with only about 1.2 to 1.9 of a mole of KOH in contrast to the former reaction in which 2 to 4 moles of KOH are used.

According to the present invention, a new composition is formed by the newly discovered process step in which only about half the previously used caustic is added to the reaction mixture. Only about 1 to 1.9 moles and preferably only 1.2 to 1.6 moles of potassium hydroxide are used. In addition, at this stage, the use of the small and limited amount of potassium hydroxide follows the addition of .05 to about 0.3 mole of hexamine (based on the use of one mole of hexamine, as the starting ingredient). The resulting reaction product and solution surprisingly provides a good anode corroder and an excellent smoothing and grain refining agent; the plate is denser and the cathode efficiency is improved over the previously described reaction product which was made alkaline with the use of a relatively large amount of caustic.

In the composition and method of the present invention, the pH of the resultant solution generally ranges from about 9½ to 10½ whereas the previous described solution using larger amounts of caustic and using no additional hexamine—the resultant pH was at least about 10½ and often about 11½ up to as high as 12.

Unexpectedly, the use of more hexamine at a different stage of the caustic reaction produces a substantially more effective agent; apparently some reaction, not completely understood, takes place as a result of the double use of the hexamine.

Thus, in accordance with the present invention, the improved anode corroder and smoothing and grain refining agent (a solution) comprises a heterogeneous mixture of amino derivatives of salicylic acid including para and ortho derivatives by virtue of the reaction of salicylic acid with hexamethylene tetramine. As previously pointed out, the mixture also includes additional reaction products formed when the smal amount of hexamine is added to the acid reaction product (pH: 2½ to 5½) and then reacted with the limited amount of KOH. The resultant solution provides an excellent anode corroder and a very good smoothing and grain refining agent for zinc, copper and zinc alloys in alkaline cyanide plating baths.

The resultant solution contains some amino derivatives of salicylic acid including some p-amino salicylic acid, unreacted starting ingredients including unreacted salicylic acid and hexamine and has a final pH of preferably about 9½ to 10½.

In general, a temperature range of about 125° to 190° F. may be employed to react the salicylic acid and hexamethylene tetramine. It has been found that the reaction is much too slow below 125° F. for commercial use. On the oher hand, when a temperature of over 190° F. is used the reaction product has a much darker color and is generally not as acceptable for addition to a plating bath.

The preferred temperature range is about 155° to 175° F. in order to obtain the best reaction product of hexamethylene tetramine and salicylic acid. However the best results have been found at a temperature of around 158° to 168°, evidently producing the best mixture of amino derivatives of salicylic acid, which heterogeneous mixture of derivatives may be part of the reason why it is so outstanding in use as an anode corroder and a smoothing and grain refining agent.

Generally, when forming the reaction product of hexamine and salicylic acid, a pH of about 2½ to 5½ should be employed. Usually, when the pH is down around 2½ or under, the salicylic acid is less soluble, the solution is too acidic and reacts differently. On the other hand when the pH of the reaction mixture is above 6, the result of its use as a catalytic ingredient in a plating bath is not the same as when the pH is lower, say, around 5. Apparently the same desirable reaction product is not formed at the higher pH.

The para-amino salicylic acid derivatives are apparently the most desirable reaction products and they have the basic formula of salicylic acid in which the following groups are attached to the para-amino position of the benzene ring of the salicylic acid;

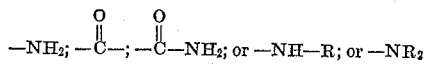

where R is a residue of the reaction of the hexamethylene tetramine with the salicylic acid and where R is preferably a short chain alkyl group such as methyl or ethyl, of which the methyl group is highly preferred, or where R is methylol.

In combination with the temperature range of 125° to 190° and the pH range of 2½ to 5½, the reaction time should be at least 8 hours and preferably around 20 to 40 hours—although generally for commercial use, the reaction may be run in the neighborhood of 16 to 32 hours. During the reaction the amount of each of the ingredients used is important. Per one mole of hexamine, generally at least about 1½ moles of salicylic acid may be used to provide at least a portion of the desired p-amino derivative, although it is preferred that about 2½ up to as high as 3¼ to 3½ moles of salicylic acid be used under the above reaction conditions just described. As previously indicated, no more than 4 moles of salicylic acid should be used to obtain a commercially useful product.

After the reaction has been completed and all the salicylic acid has been dissolved and the gassing has ceased, an additional portion of hexamine is added and then an alkaline metal hydroxide preferably potassium hydroxide should be added to bring the pH of the solution up to about 9½ to 10½. Again, while a pH of 8½ to 10½ or even as high as 12 may be useful, a pH of 9½ to 10½ is highly preferred, with the best results being around 10. Likewise, the pH of 8½ or less does not provide sufficient solubility or stability.

Thus, on the basis of 1200 lbs. of salicylic acid used as one of the starting ingredients, generally 300 to 600 lbs. of hexamine may be used although the preferred amount is about 380 to 500 lbs. Likewise, the preferred amount of potassium hydroxide used is about 200 lbs. although 150 to 250 lbs. may be used with the 1200 lbs. of salicylic acid. As to the amount of water used in the reaction, generally 2300 to 2600 lbs. or up to as high as 3600 lbs. is preferred.

Also in the above process, it is highly desirable to let the acidic reaction solution stand at about 8 to 32 hours and preferably 16 to 32 hours or, best, 20 to 28 hours before reacting the acidic reaction product with the additional hexamine and then the potassium hydroxide.

While adding the potassium hydroxide in accordance with the present invention, it is also preferred that about 1 to 3 moles of an alkaline metal salt of tartaric acid be used, the preferred additive being potassium tartrate although other alkali tartrates may also be added. On the basis of starting with 1200 parts by weight of salicylic acid and 400 to 500 parts of hexamine, generally about 400 to 2000 parts by weight of potassium tartrate may be added although for best results about 1000 to 1500 parts should be used.

While not desiring to be strictly held to a particular theory, it is probable that formation of one or more of the amine derivatives of salicylic acid provide the solution with its anode corroding ability and its smoothing and grain refining activity. Apparently main products and side products are formed in which the following groups are attached to the benzene ring of the salicylic acid on positions para and ortho to the carbonyl group; amino, carbonyl followed by an amino group, —NHR or —NR₂ where R is preferably methyl or even ethyl or methylol, or amino followed by methylol.

In accordance with the present invention, a suitable composition for electroplating baths for metals such as copper, zinc and copper-zinc alloys is one comprising an aqueous solution containing (1) a reaction product of salicylic acid and hexamine in which the product includes p-amino salicylic acid and compounds having the following formulas:

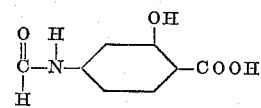

and

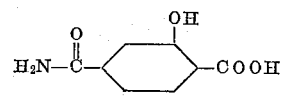

(2) hexamethylene tetramine, (3) potassium tartrate and the solution having a pH of substantially less than about 10½.

The following examples are used to illustrate the invention and not to limit it in any way.

*Example 1*

A reaction product of salicylic acid and hexamine was made by mixing 1200 lbs. of salicylic acid and 400 lbs. of hexamethylene tetramine (hexamine) in an aqueous solution of 300 gallons of the solvent comprising about 2490 lbs. of water. The salicylic acid and hexamine were heated at a temperature of about 160° F. for a period of 24 hours to produce some derivatives of hexamine and salicylic acid. The temperature of the reaction was held within 3° of 160° F. at a pH of 4.3 to 4.5. The

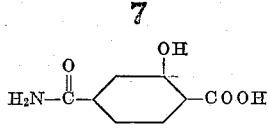

(2) hexamethylene tetramine, (3) potassium tartrate and the solution having a pH of substantially less than about 10½.

11. A composition comprising an aqueous solution having a pH less than about 10½ and containing (1) a reaction product of salicylic acid and hexamine having the general formula:

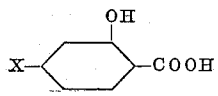

where X is a member of the group consisting of

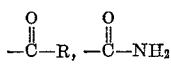

—NH—R, and —NR$_2$ in which R is an alkyl-containing radical of the group consisting of alkyl and alkylol, (2) hexamethylene tetramine, and (3) an alkali metal tartrate.

12. A composition comprising an aqueous solution having a pH of less than about 10½ and containing (1) a reaction product of salicylic acid and hexamine including para-amino salicylic acid, (2) hexamethylene tetramine, and (3) an alkali metal tartrate.

13. A composition comprising an aqueous solution containing reaction product of salicylic acid and hexamine, hexamine, unreacted salicylic acid, and having a pH of about 8½ to 10½, said reaction product comprising para-amino salicylic acid.

14. A composition comprising an aqueous solution containing a reaction product of salicylic acid and hexamine, unreacted hexamine, unreacted salicylic acid, potassium tartrate and having a pH of about 8½ to 10½, said reaction product comprising para-amino salicylic acid.

15. A composition comprising an aqueous solution containing reaction product of salicylic acid and hexamine, said product being reacted at a pH of about 2½ to 5½ for at least 4 hours at a temperature of about 125° to 195° F. and thereafter reacted first with an alkali hydroxide and second with additional hexamine and said hydroxide, said composition also containing unreacted hexamine, unreacted salicylic acid, and having a pH of about 8½ to 10½.

References Cited by the Examiner
UNITED STATES PATENTS
1,825,636   9/31   Pink _____ 260—248.5

JOHN H. MACK, *Primary Examiner.*
JOHN R. SPECK, MURRAY TILLMAN. *Examiners.* batch was vigorously stirred for the first 15 minutes and thereafter the reaction allowed to proceed with intermittent stirring. The reaction was allowed to proceed for 24 hours, the 24 hour period including an 8 hour period of cooling to room temperature.

Thereafter a premixed solution of 200 lbs. of potassium hydroxide and 60 lbs. of hexamine dissolved in 800 lbs. of water was added with stirring to the solution to bring the pH up to 9.5.

The resultant solution was found to be an excellent anode corroder and smoothing and grain refining agent for zinc and zinc alloy cyanide plating baths.

*Example 2*

Another reaction product of salicylic acid and hexamine was made by mixing and heating 1200 lbs. of salicylic acid and 425 lbs. of hexamine were reacted at 170° F. in 2500 parts by weight of water for 24 hours. After settling for 16 hours, the resultant solution was treated with a premixed solution of 200 lbs. potassium hydroxide, 30 lbs. of hexamine, and 1100 lbs. of potassium tartrate dissolved in about 700 lbs. of water. The premixed solution was added to the main batch with stirring and the resultant solution was used as a anode corroder and smoothing and grain refining agent in copper cyanide plating baths with good results. In the above described reaction with the premixed solution, the temperature of the batch was held within 5° of 140° F. for 8 hours.

*Example 3*

Again, 1200 lbs. of salicylic acid was reacted with hexamine. This time, 350 lbs. of hexamine was reacted according to the method described in Example 1 at 160° F. for about 24 hours. This solution was allowed to remain standing for 8 hours and thereafter, 120 lbs. of hexamine was added and reacted therewith. Then, after 1 hour, 250 lbs. of potassium hydroxide, and 1000 lbs. of potassium tartrate was added to the solution as a premixed additive in about 600 lbs. of water. The resultant solution had a pH of about $9\tfrac{9}{10}$ and was useful as a anode corroder and smoothing and grain refining agent in copper, zinc, and copper-zinc alloy cyanide plating baths.

In the above examples, the potassium hydroxide can be substituted for by sodium hydroxide. Likewise, sodium tartrate or potassium bitartrate can be used in place of all or part of the potassium tartrate to provide similar results. Likewise, other suitable reaction conditions of temperature, pH and amounts of ingredients (as previously described) may be used in place of the actual conditions of temperature, pH and amount of ingredients used in the above examples to provide a solution containing amino derivatives of salicylic acid capable of producing results similar to that of the solutions of the above examples.

What is claimed is:

1. A method of making a solution containing a derivative of salicylic acid comprising the steps of reacting about 1 to 4 moles of salicylic acid with about 1 mole of hexamethylene tetramine in water at a temperature of about 125° to 190° F. and a pH of about 2½ to 5½ for at least about 4 hours to provide a reaction mixture, adding about 1 to about $1\tfrac{9}{10}$ moles of an alkali hydroxide and about 0.05 to 0.3 mole of hexamethylene tetramine to the reaction mixture, reacting said mixture with said hydroxide and said hexamethylene tetramine at a temperature below 190° F. to provide a solution having a pH of about 8½ to 10½.

2. A method of making a solution containing derivatives of salicylic acid comprisng the steps of reacting about 2½ to 3¼ moles of salicylic acid with about 1 mole of hexamethylene tetramine in about 30 to 90 moles of water at a temperature of about 125° to 190° F. and a pH of about 2½ to 5½ for about 8 to 72 hours to provide a reaction mixture, allowing said mixture to stand at least about 8 hours, and thereafter reacting the mixture with about 5 to 25 moles of water, about 1 to about $1\tfrac{9}{10}$ moles of potassium hydroxide and about 0.05 to 0.3 mole of hexamethylene tetramine.

3. A method of making a solution containing derivatives of salicylic acid comprising the steps of reacting about 2½ to 3¼ moles of salicylic acid with about one mole of hexamethylene tetramine in water at a temperature of about 125° to 190° F. and a pH of about 4 to 5 for at least 4 hours to provide a reaction mixture, cooling said mixture to room temperature, allowing said mixture to stand for about at least 8 hours, and thereafter reacting the mixture with about 1.2 to about 1.6 moles of potassium hydroxide and about 0.05 to 0.3 mole of hexamethylene tetramine and about 1 to 3 moles of a salt of an alkali metal and tartaric acid to provide a solution containing a derivative of salicylic acid.

4. A method as defined in claim 1 in which the alkali hydroxide is potassium hydroxide.

5. A method as defined in claim 3 in which the alkali metal salt is potassium tartrate.

6. A method of making a solution containing a reaction product of salicylic acid comprising the steps of mixing about 1000 to 1400 parts by weight of salicylic acid and about 300 to 500 parts by weight of hexamethylene tetramine in about 2300 to 2600 parts by weight of water at about 125° to 190° F. and a pH of about 4 to 5 for about 20 to 40 hours, and thereafter adding to and mixing therein a premixed solution of (1) about 400 to 2000 parts by weight of potassium tartrate, (2) about 150 to 350 parts by weight of potassium hydroxide, and (3) about 10 to 100 parts by weight of hexamethylene tetramine in about 400 and 1200 parts by weight of water to provide a solution having a pH of less than about 10½ and containing a reaction product of salicylic acid.

7. A method of making a solution containing a reaction product of salicylic acid comprising the steps of mixing about 600 to 1400 parts by weight of salicylic acid and about 300 to 500 parts by weight of hexamethylene tetramine in about 2300 to 3600 parts by weight of water at about 158° to 162° F. and a pH of about 4.2 to 4.5 for about 20 to 40 hours, and thereafter adding to and mixing therewith a premix solution of about 600 to 2000 parts by weight of sodium tartrate and about 180 to 220 parts by weight of potassium hydroxide and about 10 to 30 parts of hexamethylene tetramine in about 400 to 1200 parts by weight of water to provide a solution containing a reaction product of salicylic acid.

8. A method of making a solution containing a derivative of salicylic acid comprising the steps of reacting about 1200 parts by weight of salicylic acid with about 300 to 500 parts by weight of hexamethylene tetramine in an aqueous solution at a temperature of about 155° to 170° F. at a pH of about 4 to 5 for about 20 to 28 hours until substantially all the solid salicylic acid is used up and substantially all the gassing is completed to form a reaction mixture, reacting with said mixture about 3 to 50 parts of hexamethylene tetramine, and thereafter reacting about 180 to 200 parts by weight of potassium hydroxide with the reaction mixture to provide a solution containing derivatives of salicylic acid and having a pH of about 9½ to 10½.

9. A composition comprising an aqueous solution containing a reaction product of salicylic acid and hexamine, unreacted hexamine, unreacted salicylic acid, potassium tartrate and having a pH of about 8½ to 10½.

10. A composition comprising an aqueous solution containing (1) a reaction product of salicylic acid and hexamine in which the product includes p-amino salicylic acid and compounds having the following formulas:

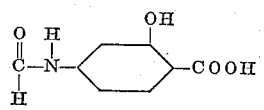

and